United States Patent [19]
Arnold et al.

[11] 4,181,238
[45] Jan. 1, 1980

[54] VENTING TANK CLOSURE

[75] Inventors: Paul W. Arnold, Kansas City; William L. Scofield, Lee's Summit; Ronald W. Borst, Kansas City; Vern D. Scott, Independence, all of Mo.

[73] Assignee: Clay & Bailey Manufacturing Company, Kansas City, Mo.

[21] Appl. No.: 971,186

[22] Filed: Dec. 20, 1978

[51] Int. Cl.² ............................................. B65D 45/28
[52] U.S. Cl. .................................... 220/314; 220/203; 220/206
[58] Field of Search ............... 220/203, 206, 314, 324, 220/334, 378; 292/251.5; 105/377; 137/43, 493

[56] References Cited

U.S. PATENT DOCUMENTS

| | | | |
|---|---|---|---|
| 3,339,791 | 9/1967 | De Frees | 220/314 |
| 3,344,947 | 10/1967 | Gallup | 220/314 |
| 3,744,670 | 7/1973 | De Frees | 220/314 |
| 4,127,215 | 11/1978 | Morrison | 220/314 |

*Primary Examiner*—George T. Hall
*Attorney, Agent, or Firm*—Thomas M. Scofield

[57] ABSTRACT

Improvements in venting manhole covers for liquid containing vessels, tanks, containers and particularly mobile truck tanks for transporting volatile liquids; improved primary venting means enabling vessel closures to vent under internal pressures; improved spring loaded pressure relief means for tank closures.

12 Claims, 3 Drawing Figures

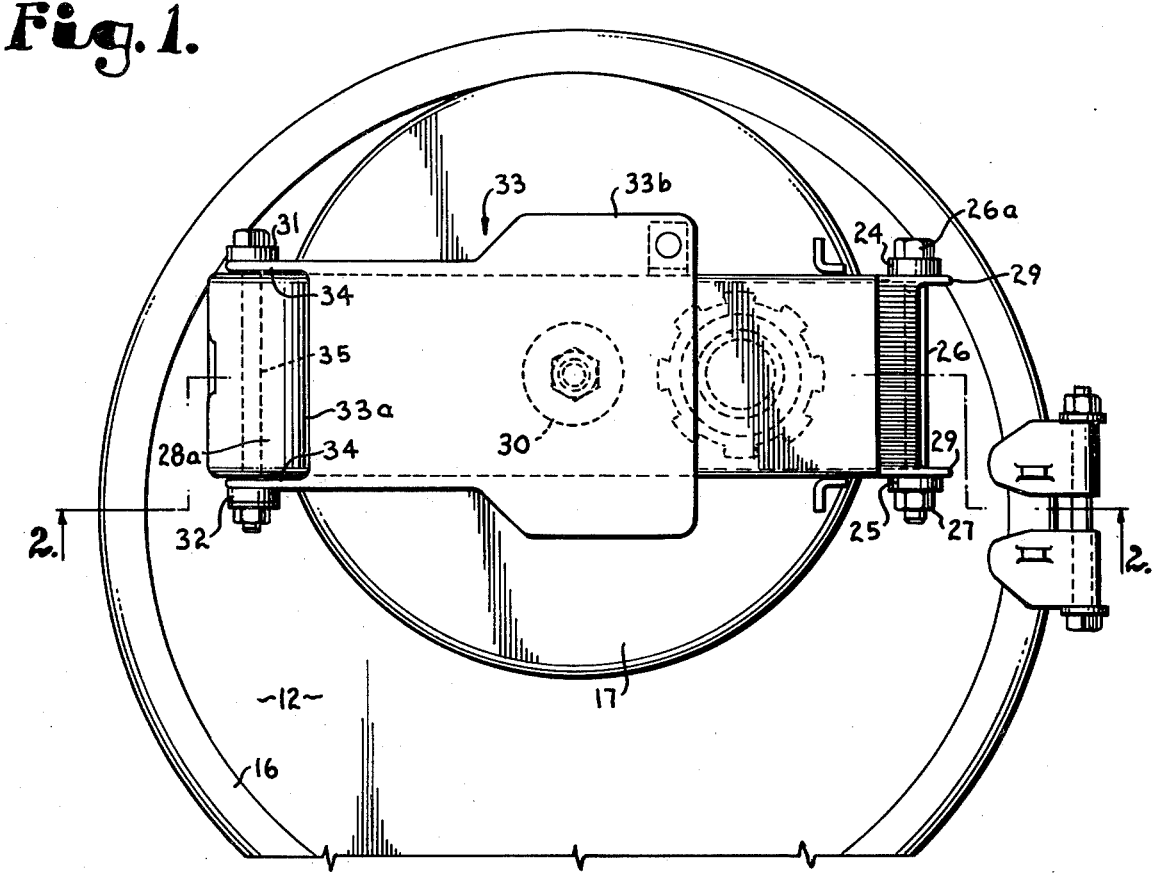
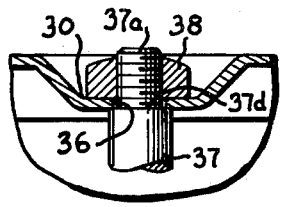
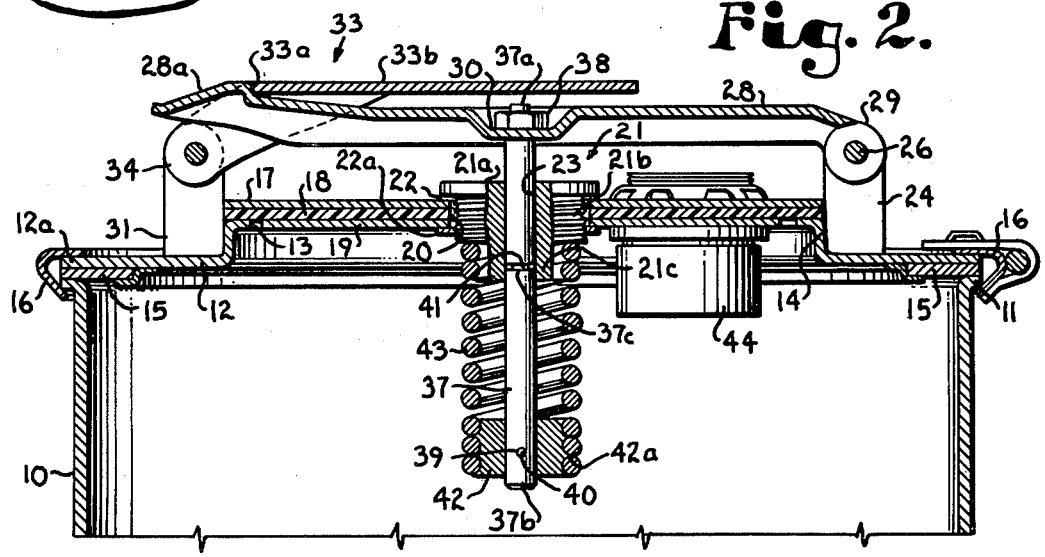

VENTING TANK CLOSURE

BACKGROUND OF THE INVENTION

This invention relates to improvements in venting manhole covers for vessels, containers and, most particularly, mobile tanks which contain and transport liquids, particularly gasoline and other volatile and possibly flammable liquids.

Truck tanks for transportation of volatile and combustible liquids and the storage vessels for such have manholes integral therewith both for filling and access to the interior of the tanks for cleaning, repair and inspection of same. Such manholes necessarily have covers which can be both fixed over the manhole and readily removable therefrom.

The prior art, some of which is herebelow listed, discloses numerous means to permit tank manholes covers to vent under sudden increase of internal tank pressures, thereby to avoid rupturing of the seams of the tank. In one construction, the fill cover plate itself is sufficiently resilient to vent around its edges when a pressure excess occurs within the tank. Another development shows a cover with a resiliently secured latch which releases when excess internal tank pressure rise occurs. Even the arm conventionally extending over the manhold cover to secure it in the down position has been disclosed in the prior art as capable of some yielding, thus, there has been disclosed a rigid cover with a semi-rigid arm extending across its top.

It has proven to be most desirable in manhole closure constructions to employ a rigid cover plate for the fill hole in order to avoid deformation of the cover plate under circumstances other than internal tank pressure changes. Still further, it has proved most desirable in such structures to provide venting constructions and functions independent both of the latching and securing of the tank cover, as the structural integrity of the lock arm and latches therefor, as well as their strength, can be very important in other circumstances than venting.

Typically, truck manhole covers are provided with low pressure primary venting means which accomplish any venting necessary to accommodate internal fluid changes in the tank contents due to temperature changes and the like. Such low pressure venting devices are operable to release any pressures up to and including (typically) a pound and a half per square inch. If a typical tank trailer overturns, the hydrostatic head of a full tank is approximately three pounds per square inch or under. Another limit which must be observed is the tank internal pressure which will spring the seams of the tank. An example of such a pressure would be twelve pounds per square inch. Thus, it is desirable to have a secondary vent for the tanks which will function only over the three pound limit and under the twelve pound limit to accommodate sudden rises in pressure due to various circumstances which threaten the integrity of the tank itself.

THE PRIOR ART

Applicant is aware of the following prior art patents relating to this subject matter. I first list U.S. Pat. Nos. directed to pressure relief means for tank closures of the particular type with respect to which this invention is involved:

Etnyer 2,279,666 issued Apr. 14, 1942 for "Pressure Release Closure Device";
DeFrees 2,783,913 issued Mar. 5, 1957 for "Manhole Cover Attaching Means"; and
DeFrees 3,339,791, issued Sept. 5, 1967 for "Emergency Venting Manhole Cover".

This invention is, particularly, an improvement over DeFrees 3,339,791.

The following patents are directed to inwardly venting closures for tank manholes (for the purpose of preventing the build up of vacuum conditions within a tank);

DeFrees 2,533,771 issued Dec. 12, 1950 for "Vented Closure For Milk Tank Manholes"; and
Phillips 2,776,070 "Self-Aligning, Self-Venting Hatch Cover Means" issued Jan. 1, 1957.

The following patents are directed to relief valve and venting means for analogous types of tank closures:

Raymond 1,645,722 "Relief Valve Mechanism For Oil Tanks" issued Oct. 18, 1927;
Raines 1,923,503 "Tank Valve" issued Aug. 22, 1933;
Nerem 1,982,118 "Combination Manhole Cover And Safety Valve" issued Nov. 27, 1934;
Nelson et al 2,005,469 "Tank Closure" issued June 18, 1935;
Tokheim 2,152,422 "Safety Device For Volatile Liquid Storage Tanks" issued Mar. 28, 1939;
Draine 2,169,410 "Breather Valve And Hatch For Tanks" issued Aug. 15, 1939;
Draine 2,183,448 "Release Valve For Tanks" issued Dec. 12, 1939;
Draine 2,288,230 "Gage And Thief Hatch" issued June 30, 1942; and
Lebus 2,351,526 "Gas Tank Fitting" issued June 13, 1944.

Other manhole cover relief devices include fusible pressure relief means, heat responsive, breakable attaching means and magnetically biased vents. Examples of these are seen in:

DeFrees 3,179,285 "Manhole Fusible Joint And Improved Gasket" issued Apr. 20, 1965;
Krone 3,292,814 "Fusible Pressure Release For Tanks And The Like" issued Dec. 20, 1966;
Wilson et al 3,433,387 "Breakable Attaching Means For A Vent Closure" issued Mar. 18, 1969; and
Sieverin 3,502,361 "Magnetically Biased Tank Vent" issued Mar. 24, 1970.

OBJECTS OF THE INVENTION

A first object of the invention is to provide a tank or storage vessel manhole cover which, in closed position, provides a constant sealing pressure distributed uniformly about the cover on its seat.

Another object of the invention is to provide a tank manhole cover which will vent around its entire periphery at a desired predetermined internal tank pressure.

Another object of the invention is to provide a venting tank manhole cover construction of great simplicity and great strength, wherein all of the parts of the device are readily available to the operator for cleaning, repair or replacement and which is easy and cheap to manufacture, compared to the prior art devices.

Another object of the invention is to provide an improved venting tank manhole cover construction employing a rigid fill cover plate, a rigid strongback or lock arm and a rigid latch mechanism, all providing great strength with respect to these elements, which device, in addition, permits precisely controllable venting of the manhole responsive to internal pressure changes in the tank or storage vessel and wherein the venting pressure may be controlled or varied as desired.

Yet another object of the invention is to provide a venting manhole cover construction employing rigid and non-resilient members including the cover plate, the strongback or lock arm and latch means therefor, which construction permits precisely controllable venting of the manhole around the edge of the cover plate, yet wherein the cover plate latch remains securely engaged at all times, the cover plate remains undistorted and the strongback or lock arm does not yield.

Yet another object of the invention is to provide such a venting manhole cover construction employing a rigid cover, a rigid strongback or lock arm and rigid latch means therefor, in combination, which cover construction will remain closed if the tank inverts in resistance to the maximum hydraulic head of fluid in the tank, yet which will vent at a predetermined pressure above the latter limit and below the pressure which will rupture the tank seams.

Still another object of the invention is to provide venting means for a tank manhole and manhole cover construction which will vent under sudden, large increases in pressure, yet retain the cover latch in secure engagement.

Another object is to provide such a venting means wherein the spring tension may not be easily or inadvertently be varied in the field.

Other and further objects of the invention will appear in the course of the following description thereof.

DRAWINGS

In the drawings, which form a part of the instant specification and are to be read in conjunction therewith, an embodiment of the invention is shown and, in the various views, like numerals are employed to indicate like parts.

FIG. 1 is a plan view from above of the subject venting tank manhole construction with the manhole cover down upon its seat, the lock arm or strongback overlying the cover plate and fill opening and the latch member in locking engagement with the strongback.

FIG. 2 is a side, sectional view of the device of FIG. 1 taken through the center of the venting manhole construction, specifically, down the midline of each of the cover plate, the strongback and the latch arm.

FIG. 3 is a fragmentary, enlarged, sectional detail through the center of the strongback illustrating the manner of connection of the elongate shaft to the strongback or lock arm.

STRUCTURE AND FUNCTION

Turning to the drawings, flange 10 extends upwardly from the tank or storage vessel upper surface (not shown) to which it is fixedly attached and has its upper edge 11 outwardly turned. Flange 10 encircles and defines an opening in the top surface of the tank or storage vessel. Circular metal sheet or manhole cover 12, having peripheral edge 12a, as well as opening 13 at one side thereof bounded by raised internal edge 14, rests on a circular gasket 15 positioned on top of outwardly turned edge 11 of flange 10. Retaining member or ring 16 circumferentially engages the two peripheral edges 11 and 12a and compacts them together upon gasket 15 to make a sealing fit. The fill opening is defined by opening 13 in raised portion 14 of cover 12.

Circular cover plate or fill cover 17 has gasket 18 on the lower side thereof which is retained with respect to cover plate 17 by gasket retainer 19. Plate 17, gasket 18 and retainer 19 all have a central opening therethrough (generally designated 20) which receives therewithin cylindrical first spring retainer 21 (generally designated).

First spring retainer 21 has a top circular flange or cover portion 21a outboard of plate 17, overlying the latter, with externally threaded portion 21b received through opening 20 and extending past the inboard face of retainer 19. Lesser diameter coiled spring receiving portion 21c is inboard of portion 21b and integral with or fixedly attached thereto. Portion 21b of retainer 21 does not thread through opening 20 in members 17–19, inclusive. It is held therein by nut 22a which threads on portion 21b and abuts the underside of retainer 19. One or more gaskets 22 are positioned between outboard portion 21a of retainer 21 and the outboard face of plate 17 for sealing purposes. Retainer 21 has circular passage 23 centrally therethrough for a purpose to be described.

Just radially outboard of raised internal edge 14, in the right hand sides of the views of FIGS. 1 and 2, are seen paired hinge bars 24 and 25 which are rigidly fixed by welding or other conventional means to manhole cover 12. Bars 24 and 25 carry hinge bolt 26 removably mounted therebetween by nut 27 removably threaded on one end of bolt 26 opposite enlarged head 26a. Strongback or lock arm 28 is pivotably mounted on bolt 26 by end ears 29 and is typically a U-section channel member having configured free end 28a for latching purposes as will be described. Recess 30 is provided centrally of lock arm 28 intermediate the ends thereof for a shaft connection as will be described.

A second set of hinge bars 31 and 32 are rigidly connected to manhole cover 12 outboard of raised internal edge 14 in the left hand side of the views of FIGS. 1 and 2 opposite hinge bars 24 and 25. Latch member 33, generally designated, has base tabs 34 engaged by hinge bolt 35 carried by hinge bars 31 and 32 for pivotable mounting thereof. Portion 33a of latch member 33 is relieved for extension upwardly therethrough of configured free and 28a of lock arm 28 in locking relationship. The free end 33b of latch 33 is preferably of greater width than lock arm 28 for grasping by the operator to latch and unlatch the connection between the latch and the lock arm.

Connected to strongback 28 through an opening 36 at the base of recess 30 is an elongate, preferably cylindrical shaft 37 having threaded upper end 37a to engage nut 38 and lower end 37b having hole or opening 39 therethrough adapted to removably receive pin 40 therewithin. Shaft 37 additionally has groove 37c intermediate the ends thereof, in that portion received within first spring retainer 21. An O-ring, or other seal 41 is received in said groove to make a sliding seal with the internal surface of opening 23 in retainer 21. The upper end of shaft 37 must be fixed with respect to arm 28 when the subject device is in operation.

Substantially cylindrical second spring retainer 42 is slidably received on the lower end 37b of shaft 37 and removably retained thereon by pin 40. The outer periphery 42a of second retainer 42 has an enlarged thread thereon to receive the lower end of coil spring means 43 of the expansion type. Coil spring 43 threads on lower portion 21c of first retainer 21 and the external surface 42a of second retainer 42 so as to tend to move first spring retainer (and cover plate 17, gasket 18 and retainer 19) downwardly on shaft 37 in the view toward end 37b of shaft 37.

The upper threaded portion 37a of shaft 37 is of lesser diameter whereby to fit through opening 36. The shoulder of the portion of shaft 37 below 37a abuts the underside of arm 28 in recess 30 and nut 38 locks shaft 37 with respect to arm 28 at right angles thereto. The position of opening 39 for pin 40 determines the spacing of retainer 42 on shaft 37 and thus the spring tension on lid 17.

Conventional low pressure relief valve or vent 44 is provided mounted through cover 17, gasket 18 and retainer 19 via openings therethrough (not seen). This device does not form any part of the instant invention, but is necessary for operation of the system.

OPERATION

In operation of the device from the position of FIGS. 1 and 2, the operator grasps portion 33b of latch 33 and pivots the latch upwardly around bolt shaft 35. This releases configured head 28a of lock arm 38. Such action releases the extension spring pressure on lock arm 28, allowing it to move slightly clockwise in the view of FIG. 2 around pivot shaft 26. This releases pressure applied to cover plate 17 through first retainer 21, also relieving pressure on gasket 18 on lip 13. The operator may now lift the arm 28 clockwise in the view of FIG. 2 around pivot 26, thus removing the lid from opening 19. Access to the tank may now be had for fill or other purposes, as mentioned.

To close the device and retension the cover plate on ledge or lip 13, the operator moves arm 28 counterclockwise in the view of FIG. 2 to the position of FIGS. 1 and 2. Latch 33, which previously was moved counterclockwise in the view of FIG. 2, is moved clockwise so that the open end portion 33a overrides and engages configured head portion 28a. This exerts a downward thrust on arm 28 which is transmitted to second spring retainer 42 through shaft 37 by virtue of its connection to arm 28.

The thrust exerted on second retainer 42 by shaft 37 through pin 40 expands spring 43 against its engagement with first retainer 21. Since first retainer 21 is connected to plate 17, accordingly, spring tension, to the extent that shaft 37 moves through passage 23 in retainer 21, is exerted on plate 17, thus forcing it down against gasket 18 on lip 13.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A manhole cover for a liquid holding tank, comprising, in combination:
    (a) A seat which defines and extends completely and circumferentially around an opening into the tank,
    (b) A cover which closes said opening and is mounted to move into and out of engagement with the seat with one lower side thereof,
    (c) A lock arm pivotably mounted at one end thereof upon said tank adjacent said seat, said lock arm disposed to extend over said cover, seat and opening when said cover is on said seat,
    (d) A first opening through the center of the cover,
    (e) A shaft connected at its upper end to said lock arm intermediate the ends thereof and extending through said cover central opening,
    (f) A first spring mounting on said cover extending downwardly past the lower side thereof, said spring mounting aligned with said cover opening and having a second opening therethrough,
    (g) Said shaft also extending through said second opening in said first spring mounting,
    (h) A second spring mounting removably fixed to the lower end of said shaft,
    (i) Spring means mounted at its upper and lower ends on the first and second spring mountings, respectively and disposed therebetween below said cover, said spring means operable to resiliently bias the cover on the seat when the lock arm is substantially parallel to the plane of the seat, and
    (j) Latch means pivotably mounted on said tank adjacent said seat and movable into engagement with said lock arm for maintaining same extending across said tank opening in a position parallel to the plane of the seat, whereby to resiliently position said cover on said seat.

2. Means as in claim 1 including a seal cooperating between the first spring mounting means and said shaft whereby to confine liquid and vapor within said tank.

3. Means as in claim 1 wherein said shaft is length adjustable with respect to its connection with said lock arm so as to permit spring tension adjustments.

4. Means as in claim 1 wherein said first spring mounting is adjustable with respect to said cover so as to permit spring tension adjustment.

5. Means as in claim 1 wherein said spring means is threaded on said first mounting.

6. Means as in claim 1 wherein said spring means is threaded on said second spring mounting.

7. Means as in claim 1 wherein first spring mounting is received within said cover first opening and is threadably engaged with said cover in said opening.

8. A manhole cover for a liquid holding tank, comprising in combination:
    (a) A seat which defines and extends completely and circumferentially around an opening into the tank,
    (b) A cover which closes said opening and is mounted to move into and out of engagement with the seat with one lower side thereof,
    (c) A lock arm pivotably mounted at one end thereof upon said tank adjacent said seat, said lock arm disposed to extend over said cover, seat and opening when said cover is on said seat,
    (d) A hole through the center of the cover,
    (e) A shaft connected at its upper end to said lock arm intermediate the ends thereof and extending through said cover central hold,
    (f) Spring means surrounding said shaft on the length thereof extending through said cover hole and past said cover away from said lock arm,
    (g) Said spring mounted at one end on said cover and at the other end to said shaft at its extremity away from said lock arm, said spring means operable to resiliently bias the cover on the seat when the lock arm is substantially parallel to the plane of the seat, and (h) Latch means pivotably mounted on said tank adjacent said seat and movable into engagement with said lock arm for maintaining same extending across said tank opening in a position parallel to the plane of said seat, whereby to resiliently position said cover on said seat.

9. Means as in claim 8 including sealing means surrounding said shaft at its extension through said cover, whereby to confine liquid and vapor within said tank.

10. Means as in claim 8 wherein said shaft is length adjustable with respect to said lock arm whereas to permit adjustment of spring tension.

11. Means as in claim 8 wherein the connection of said spring means with respect to said cover is length adjustable so as to permit spring tension adjustment.

12. A manhole cover for a liquid holding tank, comprising, in combination:
(a) A seat which defines and extends completely circumferentially around an opening into the tank,
(b) A cover which closes said opening and is mounted to move into and out of engagement with the seat with one lower side thereof,
(c) A lock arm pivotably mounted at one end thereof upon said tank adjacent said seat, said lock arm disposed to extend over said cover, seat and opening when said cover is on said seat,
(d) A first hole through the center of the cover,
(e) A shaft connected at its upper end to said lock arm intermediate the ends thereof,
(f) A first spring mounting received within the cover center hole and fixed to said cover, said first spring mounting having a second hole therethrough,
(g) Said shaft extending through said spring mounting central hole,
(h) A second spring mounting removably fixed to the lower end of said shaft,
(i) Spring means mounted at its upper and lower ends on the first and second spring mountings, respectively, and disposed therebetween below said cover, said spring means operable to resiliently bias the cover on the seat when the lock arm is substantially parallel to the plane of the seat, and
(j) Latch means pivotably mounted on said tank adjacent said seat and movable into engagement with said lock arm for maintaining same extending across said tank opening in a position parallel to the plane of the seat, whereby to resiliently position said cover on said seat.

* * * * *